(12) United States Patent  
O'Brien et al.

(10) Patent No.: US 9,175,423 B2
(45) Date of Patent: Nov. 3, 2015

(54) COMPOSITION FOR PREPARING POLYSACCHARIDE FIBERS

(71) Applicant: E I DU PONT DE NEMOURS AND COMPANY, Wilmington, DE (US)

(72) Inventors: John P O'Brien, Oxford, PA (US); Kathleen Opper, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 453 days.

(21) Appl. No.: 13/645,570

(22) Filed: Oct. 5, 2012

(65) Prior Publication Data

US 2013/0087938 A1  Apr. 11, 2013

Related U.S. Application Data

(60) Provisional application No. 61/543,423, filed on Oct. 5, 2011, provisional application No. 61/543,428, filed on Oct. 5, 2011.

(51) Int. Cl.

| | | |
|---|---|---|
| *C08L 5/00* | (2006.01) | |
| *D01F 9/00* | (2006.01) | |
| *C08K 5/357* | (2006.01) | |
| *C08B 37/00* | (2006.01) | |
| *C08B 37/02* | (2006.01) | |
| *C08L 5/02* | (2006.01) | |
| *D01D 5/06* | (2006.01) | |

(52) U.S. Cl.
CPC ............ *D01F 9/00* (2013.01); *C08B 37/0009* (2013.01); *C08B 37/0021* (2013.01); *C08K 5/357* (2013.01); *C08L 5/00* (2013.01); *C08L 5/02* (2013.01); *D01D 5/06* (2013.01)

(58) Field of Classification Search
CPC ... C08B 37/0009; C08B 37/0021; C08L 5/00; C08L 5/02; D01F 9/00; D01D 5/06; C08K 5/357
See application file for complete search history.

(56) References Cited

U.S. PATENT DOCUMENTS

| | | |
|---|---|---|
| 4,306,059 A | 12/1981 | Yokobayashi et al. |
| 4,501,886 A | 2/1985 | O'Brien |
| 7,000,000 B1 | 2/2006 | O'Brien |
| 8,962,282 B2 * | 2/2015 | Caimi et al. .................... 435/97 |
| 2001/0051716 A1 | 12/2001 | Bengs et al. |

(Continued)

FOREIGN PATENT DOCUMENTS

WO  2005010093 A1  2/2005

OTHER PUBLICATIONS

Zhang, Pingyi et al, Effects of urea and sodium hydroxide on the molecular weight and conformation of a-(1->3)-D-glucan from Lentinus edodes in aqueous solution, Carbohydrate Research, 2000, pp. 431-438, vol. 327.

(Continued)

*Primary Examiner* — David M Brunsman

(57) ABSTRACT

This invention pertains to a novel process for preparing fibers from poly($\alpha(1\rightarrow 3)$ glucan). The fibers prepared according to the invention, have "cotton-like" properties, are useful in textile applications, and can be produced as continuous filaments on a year-round basis. The process comprises solution spinning from a novel solution of poly($\alpha(1\rightarrow 3)$ glucan) in a mixture of water and N-methylmorpholine-N-oxide followed by coagulation in a liquid coagulant that comprises a liquid that is not water.

14 Claims, 1 Drawing Sheet

(56) References Cited

U.S. PATENT DOCUMENTS

2006/0134417 A1    6/2006  Takaha et al.
2014/0179913 A1*   6/2014  Paullin et al. ............... 536/120

OTHER PUBLICATIONS

Rosenau, Thomas et al., The chemistry of side reactions and byproduct formation in the system NMMO/cellulose (Lyocell process), Progress in Polymer Science, 2001, pp. 1763-1837, vol. 26.

Albrecht, W. et al., Lyocell-Fasern (Alternative Celluloseregeneratfasern), Melliand Textilberichte, Sep. 1, 1997, pp. 575-581, vol. 78, No. 9.

International Search Report, International Application No. PCT/US2012/058850.

Simpson, Christine L. et al., Four glucosyltransferases, GtfJ, GtfK, GtfL and GtfM, from Streptococcus salivarius ATCC 25975, Microbiology, 1995, pp. 1451-1460, vol. 141.

* cited by examiner

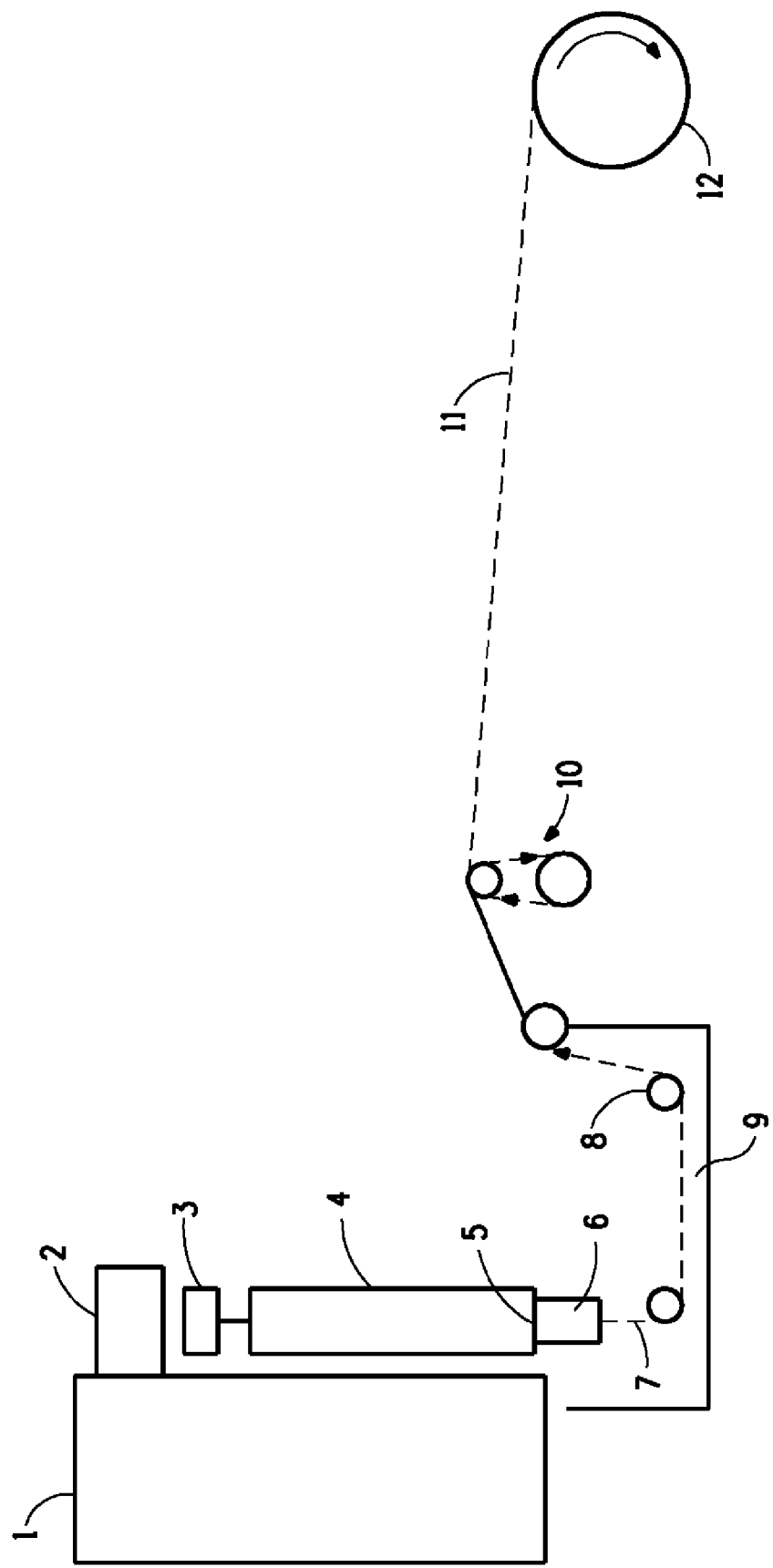

COMPOSITION FOR PREPARING POLYSACCHARIDE FIBERS

This application is a PCT application and claims the benefit of priority under 35 U.S.C. §119(e) to U.S. Provisional Patent Application Ser. No. 61/543,423, filed on Oct. 5, 2011, and U.S. Provisional Patent Application Ser. No. 61/543,428, filed Oct. 5, 2011. The disclosures of the foregoing applications are incorporated by reference in their entirety.

FIELD OF THE INVENTION

The present invention is directed to a process for solution spinning poly($\alpha$(1→3) glucan) from a solution thereof in a mixture of water and N-methylmorpholine-N-oxide, and to the solution itself. The poly($\alpha$(1→3) glucan) employed was synthesized by the action of an enzyme.

BACKGROUND OF THE INVENTION

Polysaccharides have been known since the dawn of civilization, primarily in the form of cellulose, a polymer formed from glucose by natural processes via $\beta$(1→4) glycoside linkages; see, for example, *Applied Fibre Science*, F. Happey, Ed., Chapter 8, E. Atkins, Academic Press, New York, 1979. Numerous other polysaccharide polymers are also disclosed therein.

Only cellulose among the many known polysaccharides has achieved commercial prominence as a fiber. In particular, cotton, a highly pure form of naturally occurring cellulose, is well-known for its beneficial attributes in textile applications.

It is further known that cellulose exhibits sufficient chain extension and backbone rigidity in solution to form liquid crystalline solutions; see, for example O'Brien, U.S. Pat. No. 4,501,886. The teachings of the art suggest that sufficient polysaccharide chain extension could be achieved only in $\beta$(1→4) linked polysaccharides and that any significant deviation from that backbone geometry would lower the molecular aspect ratio below that required for the formation of an ordered phase.

More recently, glucan polymer, characterized by $\alpha$(1→3) glycoside linkages, has been isolated by contacting an aqueous solution of sucrose with GtfJ glucosyltransferase isolated from *Streptococcus salivarius*, Simpson et al., Microbiology, vol 141, pp. 1451-1460 (1995). Highly crystalline, highly oriented, low molecular weight films of $\alpha$(1→3)-D-glucan have been fabricated for the purposes of x-ray diffraction analysis, Ogawa et al., Fiber Diffraction Methods, 47, pp. 353-362 (1980). In Ogawa, the insoluble glucan polymer is acetylated, the acetylated glucan dissolved to form a 5% solution in chloroform and the solution cast into a film. The film is then subjected to stretching in glycerine at 150° C. which orients the film and stretches it to a length 6.5 times the original length of the solution cast film. After stretching, the film is deacetylated and crystallized by annealing in superheated water at 140° C. in a pressure vessel. It is well-known in the art that exposure of polysaccharides to such a hot aqueous environment results in chain cleavage and loss of molecular weight, with concomitant degradation of mechanical properties.

Polysaccharides based on glucose and glucose itself are particularly important because of their prominent role in photosynthesis and metabolic processes. Cellulose and starch, both based on molecular chains of polyanhydroglucose are the most abundant polymers on earth and are of great commercial importance. Such polymers offer materials that are environmentally benign throughout their entire life cycle and are constructed from renewable energy and raw materials sources.

The term "glucan" is a term of art that refers to a polysaccharide comprising beta-D-glucose monomer units that are linked in eight possible ways, Cellulose is a glucan.

Within a glucan polymer, the repeating monomeric units can be linked in a variety of configurations following an enchainment pattern. The nature of the enchainment pattern depends, in part, on how the ring closes when an aldohexose ring closes to form a hemiacetal. The open chain form of glucose (an aldohexose) has four asymmetric centers (see below). Hence there are $2^4$ or 16 possible open chain forms of which D and L glucose are two. When the ring is closed, a new asymmetric center is created at C1 thus making 5 asymmetric carbons. Depending on how the ring closes, for glucose, $\alpha$(1→4)-linked polymer, e.g. starch, or $\beta$(1→4)-linked polymer, e.g. cellulose, can be formed upon further condensation to polymer. The configuration at C1 in the polymer determines whether it is an alpha or beta linked polymer, and the numbers in parenthesis following alpha or beta refer to the carbon atoms through which enchainment takes place.

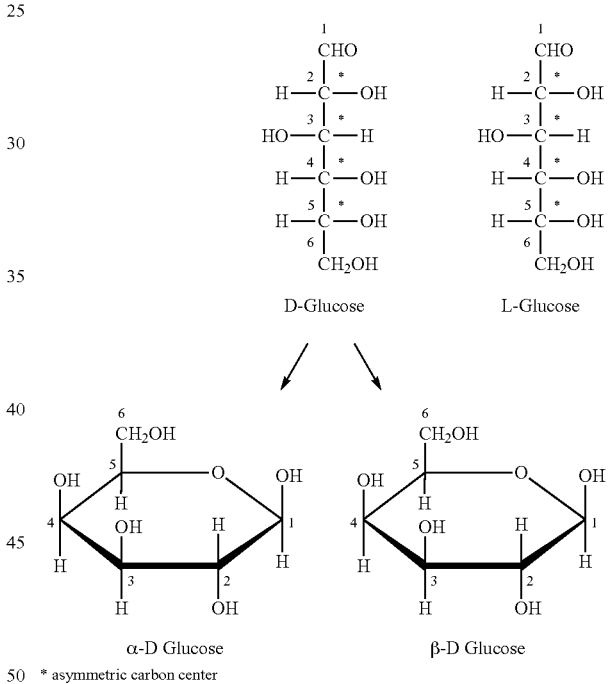

The properties exhibited by a glucan polymer are determined by the enchainment pattern. For example, the very different properties of cellulose and starch are determined by the respective nature of their enchainment patterns. Starch or amylose consists of $\alpha$(1→4) linked glucose and does not form fibers among other things because it is swollen or dissolved by water. On the other hand, cellulose consists of $\beta$(1→4) linked glucose, and makes an excellent structural material being both crystalline and hydrophobic, and is commonly used for textile applications as cotton fiber, as well as for structures in the form of wood.

Like other natural fibers, cotton has evolved under constraints wherein the polysaccharide structure and physical properties have not been optimized for textile uses. In particular, cotton fiber is of short fiber length, limited variation in cross section and fiber fineness and is produced in a highly labor and land intensive process.

O'Brien, U.S. Pat. No. 7,000,000 discloses a process for preparing fiber from liquid crystalline solutions of acetylated poly($\alpha$(1→3) glucan). Thus prepared fiber was then de-acetylated resulting in a fiber of poly($\alpha$(1→3) glucan).

SUMMARY OF THE INVENTION

Considerable benefit accrues to the process hereof that provides a highly oriented and crystalline poly ($\alpha$(1→3) glucan) fiber without sacrifice of molecular weight by the solution spinning of fiber from the novel solution hereof.

In one aspect the present invention is direct to a solution comprising N-methylmorpholine-N-oxide (NMMO), water, and poly($\alpha$(1→3) glucan) (PAG) wherein the concentration of poly($\alpha$(1→3) glucan) is in the range of 5-20% by weight with respect to the total weight of the solution; and, wherein the weight ratio of NMMO to water is in the range of 12 to 1.6.

In one embodiment, the solution is isotropic.

In another aspect, the present invention is directed to a process for preparing a poly(alpha(1→3) glucan) fiber, comprising the steps of: dissolving in a mixture of N-methylmorpholine-N-oxide (NMMO) and water, 5 to 20% by weight of the total weight of the resulting solution of poly(alpha(1→3) glucan) (PAG) characterized by a number average molecular weight ($M_n$) of at least 10,000 Da, to form a solution, wherein the weight ratio of NMMO to water in said solution is in the range of 12 to 1.6; causing said solution to flow through a spinneret, forming a fiber thereby, using a liquid coagulant to extract the NMMO from the thus formed fiber.

In one embodiment, the solution is isotropic.

BRIEF DESCRIPTION OF THE DRAWING

FIG. 1 is a schematic diagram of an apparatus suitable for air gap or wet spinning of liquid crystalline solutions of hexose polymer to form polysaccharide fibers.

DETAILED DESCRIPTION

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

The term "solids content" is a term of art. It is used herein to refer to the percentage by weight of poly($\alpha$(1→3) glucan) in the NMMO/water solution hereof. It is calculated from the formula $$SC = \frac{Wt(G)}{Wt(G) + Wt(NMMO) + Wt(\text{Water})}$$

where SC represents "solids content," and Wt(G), Wt(NMMO) and Wt(water) are the respective weights of the poly($\alpha$(1→3) glucan), the NMMO, and the water. The term "solids content" is synonymous with the concentration by weight of poly($\alpha$(1→3) glucan) with respect to the total weight of solution.

Percent by weight is represented by the term "wt-%."

While the term "glucan" refers to a polymer, it also encompasses oligomers and low molecular weight polymers that are unsuitable for fiber formation. For the purposes of the present invention, the polymer suitable for the practice thereof shall be referred to as "poly($\alpha$(1→3) glucan)."

A polymer, including glucan, and poly($\alpha$(1→3) glucan) in particular, is made up of a plurality of so-called repeat units covalently linked to one another. The repeat units in a polymer chain are diradicals, the radical form providing the chemical bonding between repeat units. For the purposes of the present invention the term "glucose repeat units" shall refer to the diradical form of glucose that is linked to other diradicals in the polymer chain, thereby forming said polymer chain.

In one aspect, the present invention provides a solution comprising N-methylmorpholine-N-oxide (NMMO), water, and poly($\alpha$(1→3) glucan) (PAG) wherein the concentration of poly($\alpha$(1→3) glucan) is in the range of 5-20% by weight with respect to the total weight of the solution; and, wherein the weight ratio of NMMO to water is in the range of 12 to 1.6.

In one embodiment, the solution is isotropic.

For the purposes of the present invention, the term "isotropic solution" refers to a solution exhibiting a disordered morphology. Isotropic solutions stand in contrast with the morphology of liquid crystalline solutions that exhibit ordered regions as described in U.S. Pat. No. 7,000,000. It has surprisingly been found that the embodiment of the solution hereof that is isotropic is useful for the preparation of fibers using common solution spinning methods such as are known in the art.

The poly($\alpha$(1→3) glucan) (PAG) suitable for use in the present invention is a glucan characterized by $M_n$ of at least 10,000 Da wherein at least 90 mol-% of the repeat units in the polymer are glucose repeat units and at least 50% of the linkages between glucose repeat units are $\alpha$(1→3) glycoside linkages. Preferably at least 95 mol-%, most preferably 100 mol-%, of the repeat units are glucose repeat units. Preferably at least 90%, most preferably 100%, of the linkages between glucose units are $\alpha$(1→3) glycoside linkages.

The isolation and purification of various polysaccharides is described in, for example, *The Polysaccharides*, G. O. Aspinall, Vol. 1, Chap. 2, Academic Press, New York, 1983. Any means for producing the $\alpha$(1→3) polysachharide suitable for the invention in satisfactory yield and 90% purity is suitable. In one such method, disclosed in U.S. Pat. No. 7,000,000, poly($\alpha$(1→3)-D-glucose) is formed by contacting an aqueous solution of sucrose with gtfJ glucosyltransferase isolated from *Streptococcus salivarius* according to the methods taught in the art. In an alternative such method, the gtfJ is generated by genetically modified *E. Coli*, as described in detail, infra.

The poly($\alpha$(1→3) glucan) suitable for use in the present invention can further comprise repeat units linked by a glycoside linkage other than $\alpha$(1→3), including $\alpha$(1→4), $\alpha$(1→6), $\beta$(1→2), $\beta$(1→3), $\beta$(1→4) or $\beta$(1→6) or any combination thereof. According to the present invention, at least 50% of the glycoside linkages in the polymer are $\alpha$(1→3) glycoside linkages. Preferably at least 90%, most preferably 100%, of the linkages between glucose units are $\alpha$(1→3) glycoside linkages.

According to the present invention, the ratio of NMMO to water on a weight basis in the solution hereof is in the range of 12 to 1.6, as determined from the formula:

ratio=(Wt. NMMO)/Wt. $H_2O$)

The solution hereof is prepared by combining NMMO, $H_2O$, and poly($\alpha$(1→3) glucan), agitating to obtain thorough mixing. The amount of poly(α(1→3) glucan) in the solution ranges from 5 to 20% by weight with respect to the total weight of the solution. At concentrations of poly(α(1→3) glucan) below 5% by weight, the fiber-forming capability of the solution is greatly degraded. Solution concentrations above 16% by weight are increasingly problematical to form. In the range of 16 to 20% by weight, increasingly refined solution forming techniques are often required.

In one embodiment, the concentration of poly(α(1→3) glucan) is in the range of 10 to 15% by weight.

In any given embodiment, the solubility limit of poly(α (1→3) glucan) is a function of the molecular weight, the NMMO/water ratio, the duration of mixing, the viscosity of the solution as it is being formed, the shear forces to which the solution is subjected, and the temperature at which mixing takes place. In general, lower molecular weight poly(α(1→3) glucan) will be more soluble than higher molecular weight, other things being equal. Generally, higher shear mixing, longer mixing time, and higher temperature will be associated with higher solubility. The maximum temperature for mixing is limited by the boiling point and stability of the solvents. The optimum NMMO/water ratio may change depending upon the other parameters in the mixing process.

In another aspect, the present invention is directed to a process for preparing a poly(alpha(1→3) glucan) fiber, comprising the steps of: dissolving in a mixture of N-methylmorpholine-N-oxide (NMMO) and water, 5 to 20% by weight of the total weight of the resulting solution of poly(alpha(1→3) glucan) (PAG) characterized by a number average molecular weight ($M_n$) of at least 10,000 Da, to form a spinning solution, wherein the weight ratio of NMMO to water in said solution is in the range of 12 to 1.6; causing said solution to flow through a spinneret, forming a fiber thereby; and, using a liquid coagulant to extract the NMMO from the thus formed fiber. In one embodiment, the spinning solution is isotropic.

While it is not strictly required in the practice of the invention, it is highly desirable to combine the water and the NMMO before the addition of the glucan polymer. The addition of water to NMMO lowers the melting point of the NMMO to the point where it can be used safely without explosive decomposition.

In a further embodiment, the isotropic spinning solution further comprises a poly(α(1→3) glucan) wherein 100% of the repeat units therein are glucose, and 100% of the linkages between glucose repeat units are α(1→3) glycoside linkages.

The minimum solids content of poly(α(1→3) glucan) required in the spinning solution in order to achieve stable fiber formation varies according to the specific molecular morphology and the molecular weight of the poly(α(1→3) glucan), as well as the NMMO/water ratio. It is found in the practice of the invention that a 5% solids content is an approximate lower limit to the concentration needed for stable fiber formation. A solution having a solids content of at least 10% is preferred. A solids content ranging from about 10% to about 15% is more preferred. Preferred is a poly(alpha (1→3) glucan) characterized by a number average molecular weight of ca. 50,000 to 70,000 Daltons. Optimum spinning performance for this particular polymer is achieved at about 10 to about 12% solids content in a NMMO/water mixture wherein the weight ratio of NMMO to water is in the range of 12 to 1.6.

Spinning from the NMMO/water solution can be accomplished by means known in the art, and as described in O'Brien, op. cit. The viscous spinning solution can be forced by means such as the push of a piston or the action of a pump through a single or multi-holed spinneret or other form of die. The spinneret holes can be of any cross-sectional shape, including round, flat, multi-lobal, and the like, as are known in the art. The extruded strand can then be passed by ordinary means into a coagulation bath wherein is contained a liquid coagulant which dissolves NMMO but not the polymer, thus causing the highly oriented polymer to coagulate into a fiber according to the present invention.

Suitable liquid coagulants include but are not limited to glacial acetic acid, or NMMO/water mixtures characterized by a water concentration of at least 75% by weight. In one embodiment, the liquid coagulant is maintained at a temperature in the range of 20-100° C.

In one embodiment, the coagulation bath comprises acetic acid. It is found in the practice of the invention that satisfactory results are achieved by employing as the coagulant liquid an excess of glacial acetic acid. During the course of spinning, the glacial acetic acid absorbs both NMMO and water as the as spun fiber passes through the coagulant bath.

Under some circumstances, a superior result is achieved when the extruded strand first passes through an inert, non-coagulating layer, usually an air gap, prior to introduction into the coagulation bath. When the inert layer is an air gap, the spinning process is known as air-gap spinning. Under other circumstances, extrusion directly into the coagulation bath is preferred, known as wet-spinning.

FIG. 1 is a schematic diagram of an apparatus suitable for use in the fiber spinning process hereof. The worm gear drive, 1, drives a ram, 2, at a controlled rate onto a piston, 3, fitted into a spinning cell, 4. The spinning cell, 4, may contain filter assemblies, 5. A suitable filter assembly includes 100 and 325 mesh stainless steel screens. Another suitable filter assembly includes a Dynalloy X5, 10 micron sintered metal filters, (Pall Corporation, Deland, Fla.). A spin pack, 6, contains the spinneret and optionally stainless steel screens as prefilters for the spinneret. The extruded filament, 7, produced therefrom is optionally directed through an inert non coagulating layer (typically an air gap) and into a liquid coagulating bath, 9. The extrudate can be, but need not be, directed back and forth through the bath between guides, 8, which are normally fabricated of Teflon® PTFE. Only one pass through the bath is shown in FIG. 1. On exiting the coagulation bath, 9, the thus quenched filament, 11, can optionally be directed through a drawing zone using independently driven rolls, 10, around which the thus quenched filament is wound. The thus prepared filament is then collected on plastic or stainless steel bobbins using a wind up, 12, preferably provided with a traversing mechanism to evenly distribute the fiber on the bobbin. In one embodiment, the process comprises a plurality of independently driven rolls.

In one embodiment, a plurality of filaments is extruded through a multi-hole spinneret, and the filaments so produced are converged to form a yarn. In a further embodiment, the process further comprises a plurality of multi-hole spinnerets so that a plurality of yarns can be prepared simultaneously.

EXAMPLES

Materials

| MATERIAL | Description | Vendor |
| --- | --- | --- |
| Dialysis tubing | Spectrapor 25225-226, 12000 molecular weight cut-off | VWR (Radnor, PA). |
| Sucrose | 15 wt-% solids aqueous solution (#BDH8029) | VWR. |

-continued

| MATERIAL | Description | Vendor |
|---|---|---|
| Dextran | T-10 (#D9260) | Sigma Aldrich. |
| Ethanol | Undenatured (#459844) | Sigma Aldrich |
| Antifoam | Suppressor 7153 | Cognis Corporation (Cincinnati, OH). |
| N-methylmorpholine N Oxide | NMMO | Sigma Aldrich |

All other chemicals were obtained from commonly used suppliers of such chemicals.

Molecular Weights

Molecular weights were determined by size exclusion chromatography (SEC) with a GPCV/LS 2000™ (Waters Corporation, Milford, Mass.) chromatograph equipped with two Zorbax PSM Bimodal-s silica columns (Agilent, Wilmington, Del.), using DMAc from J. T Baker, Phillipsburg, N.J. with 3.0% LiCl (Aldrich, Milwaukee, Wis.) as the mobile phase. Samples were dissolved in DMAc with 5.0% LiCl. The degree of polymerization shown in Table 2 is based upon number average molecular weight.

Preparation of Glucosyltransferase (gtfJ) Enzyme

Seed Medium

The seed medium, used to grow the starter cultures for the fermenters, contained: yeast extract (Amberex 695, 5.0 grams per liter, g/L), $K_2HPO_4$ (10.0 g/L), $KH_2PO_4$ (7.0 g/L), sodium citrate dihydrate (1.0 g/L), $(NH_4)_2SO_4$ (4.0 g/L), $MgSO_4$ heptahydrate (1.0 g/L) and ferric ammonium citrate (0.10 g/L). The pH of the medium was adjusted to 6.8 using either 5N NaOH or $H_2SO_4$ and the medium was sterilized in the flask. Post sterilization additions included glucose (20 mL/L of a 50% w/w solution) and ampicillin (4 mL/L of a 25 mg/mL stock solution).

Fermenter Medium

The growth medium used in the fermenter contained: $KH_2PO_4$ (3.50 g/L), $FeSO_4$ heptahydrate (0.05 g/L), $MgSO_4$ heptahydrate (2.0 g/L), sodium citrate dihydrate (1.90 g/L), yeast extract (Amberex 695, 5.0 g/L), Suppressor 7153 antifoam (0.25 milliliters per liter, mL/L), NaCl (1.0 g/L), $CaCl_2$ dihydrate (10 g/L), and NIT trace elements solution (10 mL/L). The NIT trace elements solution contained citric acid monohydrate (10 g/L), $MnSO_4$ hydrate (2 g/L), NaCl (2 g/L), $FeSO_4$ heptahydrate (0.5 g/L), $ZnSO_4$ heptahydrate (0.2 g/L), $CuSO_4$ pentahydrate (0.02 g/L) and $NaMoO_4$ dihydrate (0.02 g/L). Post sterilization additions included glucose (12.5 g/L of a 50% w/w solution) and ampicillin (4 mL/L of a 25 mg/mL stock solution).

Construction of Glucosyltransferase (gtfJ) Enzyme Expression Strain

A gene encoding the mature glucosyltransferase enzyme (gtfJ; EC 2.4.1.5; GENBANK® AAA26896.1, SEQ ID NO: 3) from *Streptococcus salivarius* (ATCC 25975) was synthesized using codons optimized for expression in *E. coli* (DNA 2.0, Menlo Park Calif.). The nucleic acid product (SEQ ID NO: 1) was subcloned into pJexpress404® (DNA 2.0, Menlo Park Calif.) to generate the plasmid identified as pMP52 (SEQ ID NO: 2). The plasmid pMP52 was used to transform *E. coli* MG1655 (ATCC 47076™) to generate the strain identified as MG1655/pMP52. All procedures used for construction of the glucosyltransferase enzyme expression strain are well known in the art and can be performed by individuals skilled in the relevant art without undue experimentation.

Production of Recombinant gtfJ in Fermentation

Production of the recombinant gtfJ enzyme in a fermenter was initiated by preparing a pre-seed culture of the *E. coli* strain MG1655/pMP52, expressing the gtfJ enzyme, constructed as described infra. A 10 mL aliquot of the seed medium was added into a 125 mL disposable baffled flask and was inoculated with a 1.0 mL culture of *E. coli* MG1655/pMP52 in 20% glycerol. This culture was allowed to grow at 37° C. while shaking at 300 revolutions per minute (rpm) for 3 hours.

A seed culture, for starting the fermenter, was prepared by charging a 2 L shake flask with 0.5 L of the seed medium. 1.0 mL of the pre-seed culture was aseptically transferred into 0.5 L seed medium in the flask and cultivated at 37° C. and 300 rpm for 5 hours. The seed culture was transferred at optical density 550 nm ($OD_{550}$)>2 to a 14 L fermenter (Braun, Perth Amboy, N.J.) containing 8 L of the fermenter medium described above at 37° C.

Cells of *E. coli* MG1655/pMP52 were allowed to grow in the fermenter and glucose feed (50% w/w glucose solution containing 1% w/w $MgSO_4.7H_2O$) was initiated when glucose concentration in the medium decreased to 0.5 g/L. The feed was started at 0.36 grams feed per minute (g feed/min) and increased progressively each hour to 0.42, 0.49, 0.57, 0.66, 0.77, 0.90, 1.04, 1.21, 1.41 1.63, 1.92, 2.2 g feed/min respectively. The rate was held constant afterwards by decreasing or temporarily stopping the glucose feed when glucose concentration exceeded 0.1 g/L. Glucose concentration in the medium was monitored using a YSI glucose analyzer (YSI, Yellow Springs, Ohio).

Induction of glucosyltransferase enzyme activity was initiated, when cells reached an $OD_{550}$ of 70, with the addition of 9 mL of 0.5 M IPTG (isopropyl β-D-1-thiogalacto-pyranoside). The dissolved oxygen (DO) concentration was controlled at 25% of air saturation. The DO was controlled first by impeller agitation rate (400 to 1200 rpm) and later by aeration rate (2 to 10 standard liters per minute, slpm). The pH was controlled at 6.8. $NH_4OH$ (14.5% weight/volume, w/v) and $H_2SO_4$ (20% w/v) were used for pH control. The back pressure was maintained at 0.5 bars. At various intervals (20, 25 and 30 hours), 5 mL of Suppressor 7153 antifoam was added into the fermenter to suppress foaming. Cells were harvested by centrifugation 8 hours post IPTG addition and were stored at −80° C. as a cell paste.

Preparation of gtfJ Crude Enzyme Extract from Cell Paste

The cell paste obtained above was suspended at 150 g/L in 50 mM potassium phosphate buffer pH 7.2 to prepare a slurry. The slurry was homogenized at 12,000 psi (Rannie-type machine, APV-1000 or APV 16.56) and the homogenate chilled to 4° C. With moderately vigorous stirring, 50 g of a floc solution (Aldrich no. 409138, 5% in 50 mM sodium phosphate buffer pH 7.0) was added per liter of cell homogenate. Agitation was reduced to light stirring for 15 minutes. The cell homogenate was then clarified by centrifugation at 4500 rpm for 3 hours at 5-10° C. Supernatant, containing crude gtfJ enzyme extract, was concentrated (approximately 5×) with a 30 kilo Dalton (kDa) cut-off membrane. The concentration of protein in the gftJ enzyme solution was determined by the bicinchoninic acid (BCA) protein assay (Sigma Aldrich) to be 4-8 g/L.

Examples 1-3 and Comparative Examples A-D

Examples 1-3

Polymer P1

Twenty liters of an aqueous solution was prepared by combining 3000 g of sucrose (in the form of an aqueous solution of 15 wt-%), 60 g of Dextran T-10, 2 L of undenatured ethanol, and 1 L of 1M $KH_2PO_4$. The pH was adjusted to pH 6.8-7.0 by addition of 10% KOH. De-ionized water was then added to bring the volume up to 20 L. The buffer concentration in the thus prepared solution was 50 mM.

The thus prepared pH-adjusted solution was then charged with 200 ml of the enzyme extract prepared supra, and allowed to stand at ambient temperature for 144 hours. The resulting glucan solids were collected on a Buchner funnel using a 325 mesh screen over 40 micron filter paper. The filter cake was re-suspended in deionized water and filtered twice more as above to remove sucrose, fructose and other low molecular weight, soluble by-products. Finally two additional washes with methanol were carried out, the filter cake was pressed out thoroughly on the funnel and dried in vacuum at room temperature. The yield was 403 grams of white flaky solids. The polymer so prepared is herein designated P1.

Number and weight average molecular weights were found to be 64,863 and 168,120 Daltons respectively.

25-30 mg of the polymer were dissolved in 1 mL of deuterated DMSO. The $^{13}$C NMR spectrum (Bruker Avance 500 MHz NMR spectrometer equipped with a CPDul cryoprobe) showed the presence of resonance peaks at 98.15, 73.57, 71.63, 70.17, 65.79 and 60.56, ppm due to incorporation of dextran primer and resonances consistant with the six expected discrete carbon atoms for poly ($\alpha(1\to3)$ glucan) at 99.46, 81.66, 72.13, 71.09, 69.66, and 60.30 ppm. These resonances were consistent with the presence of poly($\alpha(13)$ glucan) containing about 5% dextran.

Preparation of poly($\alpha(1\to3)$ glucan) Spinning Solution

In a drybox, a 100 mL wide mouth glass bottle was charged with 8 g of Polymer P1, and 46 g of anhydrous N-methylmorpholine N oxide (NMMO). To the mixture so-formed were added 21 g of deionized water containing 0.344 g of gallic acid propyl ester and 0.086 g of hydroxylamine sulfate. The container was fitted with a cap through which a polypropylene stirring rod had been fitted through a septum. The contents were then heated to 110° C. with intermittent manual mixing performed for about 5 minutes every hour over a period of 6 hours. After 1 hour, vacuum was applied to remove water while the contents continued to be mixed. After 6 hours, 0.6 g of water had been removed resulting in a fiber-forming light amber solution of 10.75% poly($\alpha(1\to3)$ glucan) solids that could be extruded into fiber under the conditions shown below.

Poly($\alpha(1\to3)$ glucan) Fiber Spinning

The apparatus depicted in FIG. 1, as described supra, was modified by removal of the driven roll, 10, from the filament pathway. Spin stretch was attained by running the windup faster than the jet velocity. The spinning solution thus prepared was fed at a rate of 0.30 ml/min through a spin pack having a filter assembly consisting of 100 and 325 mesh screens to a one hole spinneret with a diameter of 0.003 in. The extruded filament was passed through an air gap of 1.75 in. (Examples 1 and 2) or 0.75 in. (Example 3), before being immersed in and traversing a 2.5 ft. long coagulation bath containing glacial acetic acid at the temperature indicated in Table 1. Upon removal from the coagulation bath the thus coagulated filament was directed to a tension-controlled wind-up with a traverse rod, at a wind-up speed shown in Table 1.

Physical properties such as tenacity, elongation and initial modulus were measured using methods and instruments conforming to ASTM Standard D 2101-82, except that the test specimen length was one inch.

Table 1 shows the properties of the thus prepared filaments. These include the denier of the fiber produced, and the physical properties such as tenacity (T) in grams per denier (gpd), elongation to break (E, %), and initial modulus (M) in gpd were measured using methods and instruments conforming to ASTM Standard D 2101-82, except that the test specimen length was one inch. Results shown in Table 1 are averages for 3 to 5 individual filament tests.

Comparative Examples A-D

Preparation of Cellulose Spinning Solution

In a drybox, a 100 ml wide mouth glass bottle was charged with 5 g of cellulose derived from shredded Whatman #1 filter paper and 54 g of anhydrous NMMO. To the mixture so formed were added 7.6 g of deionized water containing 0.13 g of gallic acid propyl ester and 0.033 g of hydroxylamine sulfate. The container was fitted with a cap through which a polypropylene stirring rod had been fitted through a septum. The contents were then heated to 115° C. with occasional (5-10 minutes/hour) manual mixing over a period of 4 hours. At that time dissolution was complete yielding a fiber-forming light amber solution at 7.5% cellulose solids that could be extruded into fiber under the conditions shown below.

Cellulose Fiber Spinning

Cellulose filaments were prepared using the apparatus and procedures employed in Examples 1-3, as described supra, except that the feed rate of the spinning solution to the spinneret was 0.2 ml/min, and the air gap was 1.25 in. (Comparative Examples A-C) or 1.75 in. (Comparative Example D). The coagulation bath was 4.8 ft. in length, and contained water only. The coagulated cellulose fiber was wrapped around driven roll, 10, depicted in FIG. 1. The remaining conditions are shown in Table 1.

Physical properties were determined as in Examples 1-3. Results are shown in Table 1.

TABLE 1

| Examples | BATH TEMP (C) | Jet Velocity (fpm) | Roll Speed (m/min) | Wind-up Speed (fpm) | T (gpd) | E (%) | M (gpd) | dpf |
|---|---|---|---|---|---|---|---|---|
| 1 | 23 | 50 | na | 70 | 0.8 | 15.4 | 41.3 | 17.3 |
| 2 | 24 | 50 | na | 90 | 0.8 | 11.8 | 13.5 | 13.5 |
| 3 | 25 | 50 | na | 70 | 0.8 | 16.2 | 16.2 | 16.2 |
| Comp. Ex. A | 10 | 30 | 22 | 30 | 1.5 | 4.2 | 97 | 23.1 |
| Comp. Ex. B | 10 | 30 | 35 | 44 | 1.7 | 6.4 | 105 | 17.4 |
| Comp. Ex. C | 11 | 30 | 49 | 50 | 1.4 | 8.8 | 84 | 15.5 |
| Comp. Ex. D | 11 | 30 | 49 | 56 | 1.5 | 2.3 | 128 | 12.3 |

Examples 4-17 and Comparative Examples E-M

Preparation of Spinning Solutions

Solubility Determination

Solubility was determined by visual inspection of the solution in the vial after the dissolution process, described in the examples, infra, was complete. If by visual inspection no particles or haziness was observed, the poly($\alpha(1\to3)$ glucan) was said to completely dissolved. Detection of any particles or haziness was considered to be an indication of incomplete solubility.

From the standpoint of preparing solutions suitable for fiber spinning, the homogeneity imparted by complete solubility is very highly preferred.

In the data tables, infra, solubility is indicated by "S," meaning completely dissolved, or "N," meaning not completely dissolved.

Polymer Synthesis

Polymer P2

Three liters of an aqueous solution containing 15% sucrose, 9 g of Dextran T-10, 300 ml of undenatured ethanol, and 50 ml of 1 molar $KH_2PO_4$ pH 6.8-7.0, were combined in a vessel. The pH was adjusted with 10% KOH, and the volume brought up to 3 liters with de-ionized water. The solution was then charged with 20.1 ml (0.67 volume percent) enzyme prepared supra and allowed to stand at ambient temperature for 144 hours. The resulting glucan solids were collected on a Buchner funnel using a 325 mesh screen over 40 micrometer filter paper. The filter cake was suspended in deionized water and filtered twice more as above to remove sucrose, fructose and other low molecular weight, soluble by products. Finally two additional washes with methanol were carried out, the filter cake was pressed out on the funnel and dried in vacuum at room temperature. Yield was 25.5 grams of white flaky solids. The polymer so prepared is herein designated P2.

P3

Three liters of an aqueous solution containing 15% sucrose, were combined in a vessel with 9 g of Dextran T-10, 300 ml of undenatured ethanol, and 150 ml of potassium phosphate buffer adjusted to pH 6.8-7.0 using 10% KOH. The volume was brought up to 3 liters with deionized water. The solution was then charged with 30 ml (1 vol %) enzyme prepared supra and allowed to stand at ambient temperature for 72 hours. The resulting glucan solids were collected on a Buchner funnel using a 325 mesh screen over 40 micron filter paper. The filter cake was suspended in deionized water and filtered twice more as above to remove sucrose, fructose and other low molecular weight, soluble by products. Finally two additional washes with methanol were carried out, the filter cake was pressed out on the funnel and dried in vacuum at room temperature. Yield was 55.4 grams of white flaky solids. The polymer so prepared is herein designated P3.

P4

Glucan Primer 25 grams of ground polymer P3 was suspended in 500 ml of 37% HCl (EMD HX0603-4) with a magnetic stir bar in a 500 ml Erlenmeyer flask and allowed to hydrolyze for 2 hours. The acid was neutralized slowly using NaOH solids with 50 ml of water added to keep the hydrolyzed glucan in solution while being cooled in an ice bath. The solution was then dialyzed using 500 MW cut off membrane (Specta/Por Biotech Cellulose Ester (CE) MWCO 500-1,000 D) with tap water flowing at a low level overnight to remove salts. The solution was then placed in a rotovap, and the material was dried under vacuum at room temperature. The material so prepared is herein designated P3-H The materials and procedures employed for preparing polymer P1 were repeated except that 4.6 g of P3-H was employed, and the Dextran was omitted. The polymer so prepared is herein designated P4. Yield was 309 grams of white flaky solids.

P5

In a 150 gallon glass lined reactor with stirring and temperature control approximately 394 kg of an aqueous solution was prepared by combining in a vessel 75 kg of sucrose, 500 g of Dextran T-10, 3.4 kg of potassium phosphate buffer adjusted to pH 7.0 using 10% KOH, and 50 liters of undenatured ethanol. The solution was then charged with 32 units/liter of enzyme prepared supra followed by an additional 1 liter of de-ionized water. The resulting solution was mixed mildly at 25° C. for 72 hours. The resulting glucan solids was transferred to a Zwag filter with the mother liquor removed. The cake was washed via displacement with water 3 times with approximately 150 kg of water. Finally two additional displacement washes with 100 liters of methanol were carried out. The material was dried under vacuum with a 60° C. jacket. Yield: 6.6 kg white flaky solids. The polymer thus prepared is herein designated P5

P6

The materials and procedures for preparing polymer P3 were replicated except that 2.0 g of P3-H were employed and the Dextran was omitted. Yield was 68 grams of white flaky solids. The polymer so prepared is herein designated P6.

Example 4

0.5 g of Polymer P2 was added to a mixture formed by combining of 8 g of a 50/50 by weight mixture of anhydrous NMMO and water with 0.15 ml of an aqueous solution of propyl gallate (0.08M) and hydroxylamine sulfate (0.026 M). The thus combined ingredients were charged to a 40 ml glass vial. After charging, the vial was capped with a silicone septum and the vial was weighed. The septum was then fitted with a stirring rod. The vial was placed into a heating block preheated to 110° C. and kept there for 30 minutes with occasional manual stirring. After 30 minutes, vacuum was applied while continuing to heat at 110° C. to remove water to the level shown in Table 2. Final water content was determined by weighing the amount that was distilled off. Distillation of NMMO was negligible. The polymer was fully dissolved and was light amber in color. Final solids content was 8.9%.

Example 5

1.0 g of polymer P4 was suspended in 8.5 g of a 50/50 by weight mixture of anhydrous NMMO and water, to which was added 0.15 ml of an aqueous solution of propyl gallate (0.016M) and hydroxylamine sulfate (0.005 M). The ingredients were charged into a 40 ml glass vial fitted with a silicone septum. After charging the vial, its contents were weighed. A stirring rod was then inserted through the septum. The vial was then placed into a heating block preheated to 110° C. and held there for 60 minutes with occasional manual stirring. After 60 minutes, vacuum was applied while heating at 110° C. was continued, to remove water to the level shown Table 2. The polymer was fully dissolved and was light amber in color. Final solids content was 8.1 wt-%.

Example 6

8.0 g of polymer P1 was suspended in a mixture containing 46 g anhydrous NMMO, and 21 ml of an aqueous solution of propyl gallate (0.08M) and hydroxylamine sulfate (0.026 M). The ingredients were charged into a 100 ml wide mouthed glass vial. After charging, the vial was capped with a septum/stirrer and the assembly was weighed. The mixture was then heated at 110° C. for 30 minutes with occasional manual mixing. After 30 minutes vacuum was applied while continuing to heat at 110° C. to remove water to the level shown in Table 2. The polymer was fully dissolved and light amber in color. Final solids content was 10.9%.

Comparative Example E

The materials and procedures of Example 6 except that 10.0 g of polymer P1 was suspended in the NMMO/aqueous solution mixture. The polymer was not fully dissolved. Final solids content was 13.7%.

Comparative Example F

The materials and procedures of Example 6 were reproduced except that the NMMO/H$_2$O ratio was adjusted to a different value as shown in Table 2. The resulting solution was light amber in color. The presence of some particulate indicated that the polymer was not fully dissolved. Final solids content was 11.0%.

Comparative Example G

The materials and procedures of Example 6 were reproduced except that the NMMO/H$_2$O ratio was adjusted to a different value as shown in Table 2. The resulting solution was light amber in color. The presence of some particulate indicated that the polymer was not fully dissolved. Final solids content was 10.8%.

Comparative Example H

The materials and procedures of Example 6 were reproduced except that the NMMO/H$_2$O ratio was adjusted to a different value as shown in Table 2. In addition, following the vacuum distillation of water, the vacuum was turned off, the mixture was blanketed with nitrogen, and allowed to continue heating at 110° C. for an additional 60 minutes with occasional mixing. The resulting solution was light amber in color. The presence of some particulate indicated that the polymer was not fully dissolved. Final solids content was 10.8%.

Example 7

0.5 g of polymer P3 was suspended in a mixture containing 6 g of NMMO and 6 ml of an aqueous solution of propyl gallate (0.08M) and hydroxylamine sulfate (0.026 M). The ingredients were charged into a 40 ml glass vial fitted with a silicone septum and stirring rod. After charging the vial and its contents were capped and weighed. The mixture was then heated at 110° C. for 30 minutes with occasional manual mixing. After 30 minutes vacuum was applied while heating at 110° C. to remove water to the level shown in the table. following the vacuum extraction of water, the vacuum was turned off, the mixture was blanketed with nitrogen, and allowed to continue heating at 110° C. for an additional 3 hours with occasional mixing. The resulting solution was completely clear and was light amber in color. Final solids content was 5.6%

Example 8

0.5 g of polymer P3 was suspended in a mixture containing 5 g NMMO and 5 ml of an aqueous solution of propyl gallate (0.08M) and hydroxylamine sulfate (0.026 M). The equipment and procedures of Example 7 were repeated. The resulting solution was completely clear and was light amber in color. Final solids content was 6.3%

Example 9

0.5 g of polymer P3 was suspended in a mixture 4 g NMMO and 4 ml of an aqueous solution of propyl gallate (0.08M) and hydroxylamine sulfate (0.026 M). The equipment and procedures of Example 7 were repeated. The resulting solution was completely clear and was light amber in color. Final solids content was 8.7%

Comparative Example I 0.5 g of polymer P3 was suspended in a mixture containing 3 g NMMO and 3 ml of an aqueous solution of propyl gallate (0.08M) and hydroxylamine sulfate (0.026 M). The equipment and procedures of Example 7 were repeated. After 3 hours the glucan polymer was gel like with some particulate and was light amber in color. Final solids content was 10.1%

Example 10

3.17 g of 97% NMMO was transferred to a tared 20×125 mm tissue culture tube. 1.63 g (excess) de-ionized water was added to the tube. The tube was capped with a septum, and a plastic stirring rod was inserted through a pre-bored Teflon®-coated silicone septum. The mixture so formed was stirred for approximately 1 minute. After stirring, 0.12 ml of a stabilized aqueous solution containing 0.4 wt % hydroxylamine sulfate and 1.7 wt % propyl gallate was added to the tube and further mixing was conducted for 2 to 5 minutes. 0.25 g of Polymer P5 was added to the tube and the resulting mixture was mixed at room temperature for an additional 2 to 5 minutes, forming a slurry.

Behind a glass shield, the tube was placed in a Pierce Reacti-therm heating module (Pierce Biotechnology, Rockford, Ill.) at 50° C. The contents of the tube were blanketed with nitrogen admitted through a needle inserted through the septum. The tube was thus heated in the block at 50° C. for 30 to 45 minutes, stirring intermittently by hand every 5 to 10 minutes. The polymer solids were observed to have been thoroughly wetted. The temperature was then raised to 100° C. over a period of 15 minutes and then held at 100° C. for 30 to 60 minutes to begin dissolution while mixing intermittently. Maintaining stirring, the temperature was then increased to 115° C. and excess water was removed under vacuum, stirring intermittently, to the concentration shown in Table 2, and to complete formation of the solution. The final composition was as shown in Table 2. The polymer was completely dissolved. Solids content of 6.84 wt % was verified by weight loss of water and confirmation by GC-MS that the distillate contained a negligible amount of NMMO.

Examples 11-17 and Comparative Examples J-P

The materials and procedures employed in Example 10 were repeated with the changes indicated in Table 2. Results are shown in Table 2.

TABLE 2

| | Polymer | | | Results | | | | |
| --- | --- | --- | --- | --- | --- | --- | --- | --- |
| Example | Designation | Amount (g) | DP | NMMO Content (final, g) | H$_2$O Content (final, g) | NMMO/ water (wt/wt) | Solids (%) | Solution Forming? |
| Ex. 4 | P2 | 0.5 | 870 | 4 | 1.13 | 3.54 | 8.88 | yes |
| Ex. 5 | P4 | 1 | 255 | 8.5 | 2.84 | 2.99 | 8.1 | yes |
| Ex. 6 | P1 | 8 | 403 | 46 | 19.3 | 2.38 | 10.91 | yes |

TABLE 2-continued

| | Polymer | | | Results | | | | |
|---|---|---|---|---|---|---|---|---|
| Example | Designation | Amount (g) | DP | NMMO Content (final, g) | H₂O Content (final, g) | NMMO/ water (wt/wt) | Solids (%) | Solution Forming? |
| Comp. Ex. E | P1 | 10 | 403 | 46 | 16.9 | 2.72 | 13.72 | no |
| Comp. Ex. F | P1 | 8 | 403 | 46 | 18.6 | 2.47 | 11.02 | no |
| Comp. Ex. G | P1 | 8 | 403 | 46 | 20.25 | 2.27 | 10.77 | no |
| Comp. Ex. H | P1 | 8 | 403 | 46 | 20.4 | 2.25 | 10.75 | no |
| Ex. 7 | P4 | 0.5 | 255 | 6 | 2.48 | 2.42 | 5.57 | yes |
| Ex. 8 | P4 | 0.5 | 255 | 5 | 2.48 | 2.02 | 6.27 | yes |
| Ex. 9 | P4 | 0.5 | 255 | 4 | 1.28 | 3.13 | 8.65 | yes |
| Comp. Ex. I | P4 | 0.5 | 255 | 3 | 1.47 | 2.04 | 10.06 | no |
| Ex. 10 | P5 | 0.25 | 372 | 3.17 | 0.38 | 8.34 | 6.84 | yes |
| Ex. 11 | P5 | 0.3 | 372 | 3.18 | 0.37 | 8.59 | 8.06 | yes |
| Ex. 12 | P5 | 0.54 | 372 | 3.18 | 0.35 | 9.09 | 14.82 | yes |
| Ex. 13 | P5 | 0.3 | 372 | 4.52 | 1.26 | 3.59 | 5.15 | yes |
| Ex. 14 | P5 | 0.36 | 372 | 3.04 | 0.29 | 10.48 | 10.15 | yes |
| Ex. 15 | P5 | 0.42 | 372 | 3.06 | 0.37 | 8.27 | 11.92 | yes |
| Ex. 16 | P5 | 0.35 | 372 | 3.05 | 0.26 | 11.73 | 9.89 | yes |
| Ex. 17 | P5 | 0.43 | 372 | 3.1 | 0.35 | 8.86 | 12.07 | yes |
| Comp. Ex. J | P6 | 0.68 | 110 | 3.4 | 1.7 | 2 | 17.21 | no |
| Comp. Ex. K | P5 | 0.69 | 372 | 3.09 | 0.55 | 5.62 | 19.37 | no |
| Comp. Ex. L | P5 | 0.88 | 372 | 3.02 | 0.48 | 6.29 | 25.26 | no |
| Comp. Ex. M | P5 | 0.23 | 372 | 2.26 | 2.26 | 1 | 4.91 | no |
| Comp. Ex. N | P5 | 0.47 | 372 | 2.27 | 2.27 | 1 | 10.08 | no |
| Comp. Ex. O | P5 | 0.7 | 372 | 2.27 | 2.27 | 1 | 15.18 | no |
| Comp. Ex. P | P5 | 0.93 | 372 | 2.28 | 2.28 | 1 | 19.92 | no |

What is claimed is:

1. A solution comprising N-methylmorpholine-N-oxide (NMMO), water, and poly(α(1→3) glucan) wherein the concentration of poly(α(1→3) glucan) is in the range of 5-20% by weight with respect to the total weight of the solution, wherein the poly(alpha(1→3) glucan) is characterized by a number average molecular weight ($M_n$) of at least 10,000 Da; and, wherein the weight ratio of NMMO to water is in the range of 12 to 1.6.

2. The solution of claim 1 in the form of an isotropic solution.

3. The solution of claim 1 wherein, in the poly(α(1→3) glucan), at least 90 mol-% of the repeat units in the polymer are glucose repeat units and at least 50% of the linkages between glucose repeat units are α(1→3) glycoside linkages.

4. The solution of claim 3 wherein, in the poly(α(1→3) glucan) 100 mol-% of the repeat units in the polymer are glucose repeat units and at least 100% of the linkages between glucose repeat units are α(1→3) glycoside linkages.

5. The solution of claim 1 wherein the concentration of poly(α(1→3) glucan) is in the range of 10 to 15% by weight.

6. The solution of claim 1 wherein the number average molecular weight of the poly(alpha(1→3) glucan) is in the range of 50,000 to 70,000 Daltons.

7. A process for preparing a poly(alpha(1→3) glucan) fiber, comprising the steps of: dissolving in a mixture of N-methylmorpholine-N-oxide (NMMO) and water, 5 to 20% by weight of the total weight of the resulting solution of poly(alpha(1→3) glucan) wherein the poly(alpha(1→3) glucan) is characterized by a number average molecular weight ($M_n$) of at least 10,000 Da, to form a solution, wherein the weight ratio of NMMO to water in said solution is in the range of 12 to 1.6; causing said solution to flow through a spinneret, forming a fiber thereby, using a liquid coagulant to extract the NMMO from the thus formed fiber.

8. The process of claim 7 wherein the solution is in the form of an isotropic solution.

9. The process of claim 7 wherein at least 90 mol-% of the repeat units in the poly(alpha(1→3) glucan) are glucose repeat units, and at least 50% of the linkages between glucose repeat units are α(1→3) glycoside linkages.

10. The process of claim 9 wherein 100 mol-% of the repeat units, in the poly(α(1→3) glucan) are glucose repeat units and at least 100% of the linkages between glucose repeat units are α(1→3) glycoside linkages.

11. The process of claim 7 wherein the concentration of poly(α(1→3) glucan) in the solution is in the range of 10 to 15% by weight.

12. The process of claim 7 wherein the number averager molecular weight of the poly(alpha(1→3) glucan) in the solution is in the range of 50,000 to 70,000 Daltons.

13. The process of claim 7 wherein the liquid coagulant is glacial acetic acid.

14. The process of claim 7 wherein the liquid coagulant is a mixture of N-methylmorpholine N oxide and water having a water concentration of at least 75% by weight.

* * * * *

SEQUENCE LISTING

<160> NUMBER OF SEQ ID NOS: 3

<210> SEQ ID NO 1
<211> LENGTH: 4434
<212> TYPE: DNA
<213> ORGANISM: artificial sequence
<220> FEATURE:
<223> OTHER INFORMATION: codon-optimized gtfj gene from Streptococcus
    salivarius

<400> SEQUENCE: 1

```
atggacgaaa cgcaggataa gaccgtgacg cagagcaaca gcggcaccac cgcttccctg      60
gtcactagcc ctgaagccac gaaagaggcg gacaaacgca cgaacactaa agaggccgac     120
gttctgacgc ctgcaaaaga aacgaacgca gtcgagactg cgaccaccac taacacccag     180
gcgacggcgg aggccgccac gaccgcgacc accgcggacg tcgcggtggc tgcggtgccg     240
aacaaagaag cggtcgttac cacggatgct ccggcggtca cgaccgagaa agcggaagaa     300
cagccggcta ccgttaaagc agaagtcgtc aatacggaag tgaaagcgcc ggaagcggct     360
ctgaaagaca gcgaggttga ggcagcgctg agcctgaaga acatcaagaa cattgatggc     420
aagtattact atgttaatga ggatggcagc cacaaagaga atttcgctat taccgtgaat     480
ggccagctgc tgtactttgg taaagacggt gcgctgacgt cctctagcac gtattctttt     540
accccaggca ctaccaatat cgtggacggt tttagcatta caaccgcgc ttacgacagc     600 agcgaggcga gctttgagct gatcgacggt tacttgaccg cagacagctg gtatcgtccg     660
gctagcatca tcaaagatgg tgttacgtgg caagcgtcca ccgccgagga ttttcgtccg     720
ctgctgatgg catggtggcc gaatgtggat acgcaggtga actatttgaa ttacatgtcc     780
aaagttttca acctggacgc gaaatactct agcaccgaca acaggaaac cctgaaagtg     840 gcagcaaaag acattcaaat caagattgaa caaaagattc aagcggagaa gagcacgcag     900
```

```
tggctgcgtg aaactatcag cgcctttgtg aaaacccagc cgcagtggaa caaagaaacc    960
gagaattaca gcaagggtgg tggtgaggac cacctgcaag gtggcgcact gctgtatgtt   1020
aacgacagcc gtacccttg ggcgaatagc gattaccgtc gtctgaatcg caccgcaacc   1080
aatcagacgg gcacgatcga taagtctatt ctggacgagc agtctgaccc aaaccacatg   1140
ggcggtttcg actttctgct ggcgaacgac gtcgacctga gcaatccggt cgtgcaggct   1200
gagcagctga tcaaatcca ctatctgatg aattggggtt ccattgtgat gggtgacaag   1260
gatgcgaact ttgacggcat tcgtgtcgat gcagttgaca acgtggacgc ggacatgttg   1320
caactgtata ccaattactt ccgtgagtac tacggtgtga acaagagcga agctaacgca   1380
ctggctcaca tcagcgttct ggaggcgtgg agcctgaatg ataatcatta caatgacaag   1440
accgatggtg cggcactggc aatggagaat aagcaacgtc tggcgctgtt gttttcgttg   1500
gcgaaaccga tcaaagagcg taccccggca gtgagcccgc tgtataacaa caccttcaat   1560
accacccagc gtgatgaaaa gaccgattgg attaacaaag acggtagcaa ggcttacaac   1620
gaagatggca cggtcaaaca atcgaccatc ggtaagtaca cgagaaata cggtgacgca   1680
tccggtaact acgttttcat ccgtgcccac gataacaacg tccaggacat catcgccgag   1740
atcatcaaga aagagatcaa cccgaaaagc gacggcttca ccatcaccga cgccgaaatg   1800
aagcaagcct ttgaaatcta taacaaagat atgctgtcga gcgacaaaaa gtataccctg   1860
aataacattc cggcagcgta tgccgtgatg ttgcagaata tggaaacgat acccgcgtc    1920
tattacggtg atctgtatac ggacgacggt cactacatgg aaaccaaatc tccgtattac   1980
gataccatcg tgaatttgat gaagagccgt atcaagtatg tttcggtgg ccaggcgcaa    2040
cgtagctatt ggctgccgac cgacggtaag atggacaata gcgacgttga gctgtaccgc   2100
acgaatgagg tttacacgag cgtgcgctat ggtaaggata tcatgaccgc taatgatacc   2160
gaaggctcta gtattcccg caccagcggc caagtcacct tggtcgcgaa caatccgaag    2220
ctgaatctgg accaaagcgc caagttgaat gtggagatgg gcaaaatcca tgcgaatcag   2280
aagtatcgcg cactgattgt cggcactgcg gacggcatta agaactttac ttccgacgcg   2340
gacgccattg cagcgggtta tgtgaaagaa accgatagca acggcgtgct gaccttcggt   2400
gctaacgaca ttaagggcta cgaaacgttt gatatgagcg gtttcgtggc ggtgtgggtt   2460
ccggtgggtg catctgacaa tcaggacatt cgtgttgcgc cgagcaccga ggcaaagaaa   2520
gaaggtgagc tgaccttgaa ggcgacggaa gcgtatgata gccagctgat ttacgaaggc   2580
tttagcaatt tccagacgat cccagatggc agcgatccgt ccgtgtatac gaaccgcaag   2640
attgcggaga acgtggatct gttcaaaagc tggggtgtca ccagctttga gatggcaccg   2700
caatttgtct cggcggatga tggcaccttt ctggatagcg ttattcagaa tggctacgcc   2760
ttcgccgacc gttatgacct ggccatgtcc aagaacaaca gtatggtag caaagaggac    2820
ctgcgtgatg cactgaaagc actgcataag gcgggtattc aagctatcgc agactgggtt   2880
ccagaccaga tctaccagct gccgggcaaa gaagttgtca ccgccacccg tacgatggt    2940
gctggccgta agatcgcaga cgcgattatc gaccattctc tgtatgttgc aaacagcaaa   3000
agcagcggca agattatca gcaaagtac ggtggcgagt tcctggccga gctgaaagcc    3060
aaatacccgg aaatgttcaa agttaacatg attagcacgg gtaagccgat tgatgactcc   3120
gtgaaattga gcaatggaa agccgagtac ttcaatggca ccaacgtttt ggaacgtggt    3180
gtcggctatg ttctgagcga cgaggcgacc ggtaagtatt tcacggtgac caaagaaggc   3240
aatttcattc cgctgcaact gacgggtaaa gagaaagtta tcacgggttt ctccagcgat   3300
```

```
ggtaagggta tcacctattt cggtacgagc ggtacgcagg cgaagtctgc gtttgttacc    3360
ttcaatggta acacctacta tttcgacgcg cgtggccaca tggttaccaa tagcgaatac    3420
agcccgaatg gcaaggacgt ctaccgtttt ctgccgaacg gtatcatgct gagcaatgcg    3480
ttttacattg atgcgaacgg taatacctac ctgtacaact ctaagggtca aatgtacaaa    3540
ggcggttaca cgaaattcga tgtttctgaa acggataagg acggtaaaga gtccaaggtc    3600
gtcaagttcc gctactttac gaacgaaggc gtcatggcca agggtgttac cgtcattgat    3660
ggttttaccc aatacttcgg tgaggacggc tttcaagcga aggataagct ggtcaccttc    3720
aagggcaaga cgtattactt cgacgcacac actggtaatg gtatcaaaga tacctggcgc    3780
aatatcaatg gtaaatggta ctatttcgac gcgaatggcg ttgctgcgac cggtgcgcag    3840
gtgattaacg gccagaaact gtacttcaac gaggatggct cccaagtcaa aggcggcgtg    3900
gttaagaacg cagacggcac ctatagcaaa tacaaagaag gttttggtga gctggttact    3960
aacgagtttt tcacgactga tggcaatgtt tggtactacg ccggtgcaaa tggtaaaacc    4020
gttaccggtg cacaagtgat caacggccaa catttgtact tcaatgcgga cggttcccag    4080
gtgaagggtg gcgttgtcaa gaacgcggat ggcacctaca gcaagtacaa tgctagcact    4140
ggtgaacgtc tgacgaacga gttctttacg accggtgata caattggta ttacattggc    4200 gcaaacggta gagcgtgac gggtgaggtc aagattggtg atgatactta cttttttcgcg    4260 aaggatggca acaagttaa aggtcaaacc gtcagcgccg gtaatggtcg cattagctac    4320
tactacggtg acagcggcaa gcgtgcggtt agcacctgga ttgagattca gccgggtgtt    4380
tatgtgtatt tcgacaaaaa cggtttggcg taccctccgc gtgttctgaa ttaa           4434

<210> SEQ ID NO 2
<211> LENGTH: 8455
<212> TYPE: DNA
<213> ORGANISM: artificial sequence
<220> FEATURE:
<223> OTHER INFORMATION: plasmid pMP52

<400> SEQUENCE: 2
ctcatgacca aaatcccctta acgtgagtta cgcgcgcgtc gttccactga gcgtcagacc     60
ccgtagaaaa gatcaaagga tcttcttgag atcctttttt tctgcgcgta atctgctgct    120
tgcaaacaaa aaaaccaccg ctaccagcgg tggtttgttt gccggatcaa gagctaccaa    180
ctctttttcc gaaggtaact ggcttcagca gagcgcagat accaaatact gttcttctag    240
tgtagccgta gttagcccac cacttcaaga actctgtagc accgcctaca tacctcgctc    300
tgctaatcct gttaccagtg gctgctgcca gtggcgataa gtcgtgtctt accgggttgg    360
actcaagacg atagttaccg gataaggcgc agcggtcggg ctgaacgggg gttcgtgcac    420 acagcccag cttggagcga acgacctaca ccgaactgag atacctacag cgtgagctat    480
gagaaagcgc cacgcttccc gaagggagaa aggcggacag gtatccggta agcggcaggg    540
tcggaacagg agagcgcacg agggagcttc caggggggaaa cgcctggtat ctttatagtc    600
ctgtcgggtt tcgccacctc tgacttgagc gtcgattttt gtgatgctcg tcagggggggc    660 ggagcctatg gaaaaacgcc agcaacgcgg cctttttacg gttcctggcc ttttgctggc    720
cttttgctca catgttcttt cctgcgttat ccctgattc tgtggataac cgtattaccg    780
cctttgagtg agctgatacc gctcgccgca gccgaacgac cgagcgcagc gagtcagtga    840
gcgaggaagc ggaaggcgag agtagggaac tgccaggcat caaactaagc agaaggcccc    900
```

```
tgacggatgg cctttttgcg tttctacaaa ctctttctgt gttgtaaaac gacggccagt    960
cttaagctcg ggcccctgg gcggttctga taacgagtaa tcgttaatcc gcaaataacg   1020
taaaaacccg cttcggcggg ttttttatg ggggagttt agggaaagag catttgtcag   1080
aatatttaag ggcgcctgtc actttgcttg atatatgaga attatttaac cttataaatg   1140
agaaaaagc aacgcacttt aaataagata cgttgctttt tcgattgatg aacacctata   1200
attaaactat tcatctatta tttatgattt tttgtatata caatatttct agtttgttaa   1260
agagaattaa gaaataaat ctcgaaaata ataagggaa atcagttttt tgatatcaaa   1320
attatacatg tcaacgataa tacaaaatat aatacaaact ataagatgtt atcagtattt   1380
attatgcatt tagaataaat tttgtgtcgc ccttaattgt gagcggataa caattacgag   1440
cttcatgcac agtgaaatca tgaaaaattt atttgctttg tgagcggata acaattataa   1500
tatgtggaat tgtgagcgct cacaattcca caacggtttc cctctagaaa taattttgtt   1560
taacttttga attctctaga ggaaggtaaa acatatggac gaaacgcagg ataagaccgt   1620
gacgcagagc aacagcggca ccaccgcttc cctggtcact agccctgaag ccacgaaaga   1680
ggcggacaaa cgcacgaaca ctaaagaggc cgacgttctg acgcctgcaa agaaacgaa   1740
cgcagtcgag actgcgacca ccactaacac ccaggcgacg gcggaggccg ccacgaccgc   1800
gaccaccgcg gacgtcgcgg tggctgcggt gccgaacaaa gaagcggtcg ttaccacgga   1860
tgctccggcg gtcacgaccg agaaagcgga agaacagccg gctaccgtta aagcagaagt   1920
cgtcaatacg gaagtgaaag cgccggaagc ggctctgaaa gacagcgagg ttgaggcagc   1980
gctgagcctg aagaacatca agaacattga tggcaagtat tactatgtta atgaggatgg   2040
cagccacaaa gagaatttcg ctattaccgt gaatggccag ctgctgtact ttggtaaaga   2100
cggtgcgctg acgtcctcta gcacgtattc ttttacccca ggcactacca atatcgtgga   2160
cggttttagc attaacaacc gcgcttacga cagcagcgag gcgagctttg agctgatcga   2220
cggttacttg accgcagaca gctggtatcg tccggctagc atcatcaaag atggtgttac   2280
gtggcaagcg tccaccgccg aggattttcg tccgctgctg atggcatggt ggccgaatgt   2340
ggatacgcag gtgaactatt tgaattacat gtccaaagtt ttcaacctgg acgcgaaata   2400
ctctagcacc gacaaacagg aaaccctgaa agtggcagca aaagacattc aaatcaagat   2460
tgaacaaaag attcaagcgg agaagagcac gcagtggctg cgtgaaacta tcagcgcctt   2520
tgtgaaaacc cagccgcagt ggaacaaaga aaccgagaat tacagcaagg gtggtggtga   2580
ggaccacctg caaggtggcg cactgctgta tgttaacgac agccgtaccc cttgggcgaa   2640
tagcgattac cgtcgtctga atcgcaccgc aaccaatcag acgggcacga tcgataagtc   2700
tattctggac gagcagtctg acccaaacca catgggcggt ttcgactttc tgctggcgaa   2760
cgacgtcgac ctgagcaatc cggtcgtgca ggctgagcag ctgaatcaaa tccactatct   2820
gatgaattgg ggttccattg tgatgggtga caaggatgcg aactttgacg gcattcgtgt   2880
cgatgcagtt gacaacgtgg acgcggacat gttgcaactg tataccaatt acttccgtga   2940
gtactacggt gtgaacaaga gcgaagctaa cgcactggct cacatcagcg ttctggaggc   3000
gtggagcctg aatgataatc attacaatga caagaccgat ggtgcggcac tggcaatgga   3060
gaataagcaa cgtctggcgc tgttgttttc gttggcgaaa ccgatcaaag agcgtacccc   3120
ggcagtgagc ccgctgtata caacacctt caataccacc cagcgtgatg aaaagaccga   3180
ttggattaac aaagacggta gcaaggctta caacgaagat ggcacggtca acaatcgac   3240
catcggtaag tacaacgaga atacggtga cgcatccggt aactacgttt tcatccgtgc   3300
```

```
ccacgataac aacgtccagg acatcatcgc cgagatcatc aagaaagaga tcaacccgaa    3360
aagcgacggc ttcaccatca ccgacgccga aatgaagcaa gcctttgaaa tctataacaa    3420
agatatgctg tcgagcgaca aaaagtatac cctgaataac attccggcag cgtatgccgt    3480
gatgttgcag aatatggaaa cgattacccg cgtctattac ggtgatctgt atacggacga    3540
cggtcactac atggaaacca aatctccgta ttacgatacc atcgtgaatt tgatgaagag    3600
ccgtatcaag tatgtttcgg gtggccaggc gcaacgtagc tattggctgc cgaccgacgg    3660
taagatggac aatagcgacg ttgagctgta ccgcacgaat gaggtttaca cgagcgtgcg    3720
ctatggtaag gatatcatga ccgctaatga taccgaaggc tctaagtatt cccgcaccag    3780
cggccaagtc accttggtcg cgaacaatcc gaagctgaat ctggaccaaa gcgccaagtt    3840
gaatgtggag atgggcaaaa tccatgcgaa tcagaagtat cgcgcactga ttgtcggcac    3900
tgcggacggc attaagaact ttacttccga cgcggacgcc attgcagcgg ttatgtgaa    3960
agaaaccgat agcaacggcg tgctgacctt cggtgctaac gacattaagg gctacgaaac    4020
gtttgatatg agcggtttcg tggcggtgtg ggttccggtg ggtgcatctg acaatcagga    4080
cattcgtgtt gcgccgagca ccgaggcaaa gaaagaaggt gagctgacct tgaaggcgac    4140
ggaagcgtat gatagccagc tgatttacga aggctttagc aatttccaga cgatcccaga    4200
tggcagcgat ccgtccgtgt atacgaaccg caagattgcg gagaacgtgg atctgttcaa    4260
aagctggggt gtcaccagct tgagatggca ccgcaatttt gtctcggcgg atgatggcac    4320
ctttctggat agcgttattc agaatggcta cgccttcgcc gaccgttatg acctggccat    4380
gtccaagaac aacaagtatg gtagcaaaga ggacctgcgt gatgcactga agcactgca    4440
taaggcgggt attcaagcta tcgcagactg ggttccagac cagatctacc agctgccggg    4500
caaagaagtt gtcaccgcca cccgtacgga tggtgctggc cgtaagatcg cagacgcgat    4560
tatcgaccat tctctgtatg ttgcaaacag caaaagcagc ggcaaagatt atcaagcaaa    4620
gtacggtggc gagttcctgg ccgagctgaa agccaaatac ccggaaatgt tcaaagttaa    4680
catgattagc acgggtaagc cgattgatga ctccgtgaaa ttgaagcaat ggaaagccga    4740
gtacttcaat ggcaccaacg ttttggaacg tggtgtcggc tatgttctga gcgacgaggc    4800
gaccggtaag tatttcacgg tgaccaaaga aggcaatttc attccgctgc aactgacggg    4860
taaagagaaa gttatcacgg gtttctccag cgatggtaag ggtatcacct atttcggtac    4920
gagcggtacg caggcgaagt ctgcgtttgt taccttcaat ggtaacacct actatttcga    4980
cgcgcgtggc cacatggtta ccaatagcga atacagcccg aatggcaagg acgtctaccg    5040
ttttctgccg aacggtatca tgctgagcaa tgcgttttac attgatgcga acggtaatac    5100
ctacctgtac aactctaagg gtcaaatgta caaaggcggt tacacgaaat cgatgtttc    5160
tgaaacggat aaggacggta agagtccaa ggtcgtcaag ttccgctact ttacgaacga    5220
aggcgtcatg gccaagggtg ttaccgtcat tgatggtttt acccaatact cggtgaggaa    5280
cggctttcaa gcgaaggata agctggtcac cttcaagggc aagacgtatt acttcgacgc    5340
acacactggt aatggtatca agataccctg gcgcaatatc aatggtaaat ggtactattt    5400
cgacgcgaat ggcgttgctg cgaccggtgc gcaggtgatt aacggccaga aactgtactt    5460
caacgaggat ggctcccaag tcaaaggcgg cgtggttaag aacgcagacg gcacctatag    5520
caaatacaaa gaaggttttg gtgagctggt tactaacgag ttttcacga ctgatggcaa    5580
tgtttggtac tacgccggtg caaatggtaa aaccgttacc ggtgcacaag tgatcaacgg    5640
```

```
ccaacatttg tacttcaatg cggacggttc ccaggtgaag ggtggcgttg tcaagaacgc    5700
ggatggcacc tacagcaagt acaatgctag cactggtgaa cgtctgacga acgagttctt    5760
tacgaccggt gataacaatt ggtattacat tggcgcaaac ggtaagagcg tgacgggtga    5820
ggtcaagatt ggtgatgata cttactttt cgcgaaggat ggcaaacaag ttaaaggtca     5880
aaccgtcagc gccggtaatg gtcgcattag ctactactac ggtgacagcg gcaagcgtgc    5940
ggttagcacc tggattgaga ttcagccggg tgtttatgtg tatttcgaca aaaacggttt    6000 ggcgtacccct ccgcgtgttc tgaattaatg agtctagact gcagggtacc aagcttcccc   6060
aagggcgaca ccccataatt agcccgggcg aaaggcccag tctttcgact gagcctttcg    6120
ttttatttga tgcctggcag ttccctactc tcgcatgggg agtccccaca ctaccatcgg    6180
cgctacggcg tttcacttct gagttcggca tggggtcagg tgggaccacc gcgctactgc    6240
cgccaggcaa acaaggggtg ttatgagcca tattcaggta taaatgggct cgcgataatg    6300
ttcagaattg gttaattggt tgtaacactg acccctattt gtttatttt ctaaatacat      6360 tcaaatatgt atccgctcat gagacaataa ccctgataaa tgcttcaata atattgaaaa    6420
aggaagaata tgagtattca acatttccgt gtcgccctta ttccctttt tgcggcattt     6480 tgccttcctg tttttgctca cccagaaacg ctggtgaaag taaaagatgc tgaagatcag    6540
ttgggtgcac gagtgggtta catcgaactg gatctcaaca gcggtaagat ccttgagagt    6600
tttcgccccg aagaacgttt tccaatgatg agcactttta aagttctgct atgtggcgcg    6660
gtattatccc gtattgacgc cgggcaagag caactcggtc gccgcataca ctattctcag    6720
aatgacttgg ttgagtactc accagtcaca gaaaagcatc ttacggatgg catgacagta    6780
agagaattat gcagtgctgc cataaccatg agtgataaca ctgcggccaa cttacttctg    6840
acaacgatcg gaggaccgaa ggagctaacc gcttttttgc acaacatggg ggatcatgta    6900
actcgccttg atcgttggga accggagctg aatgaagcca taccaaacga cgagcgtgac    6960
accacgatgc ctgtagcgat ggcaacaacg ttgcgcaaac tattaactgg cgaactactt    7020
actctagctt cccggcaaca attaatagac tggatggagg cggataaagt tgcaggacca    7080
cttctgcgct cggcccttcc ggctggctgg tttattgctg ataaatccgg agccggtgag    7140
cgtggttctc gcggtatcat cgcagcgctg gggccagatg gtaagccctc ccgtatcgta    7200
gttatctaca cgacggggag tcaggcaact atggatgaac gaaatagaca gatcgctgag    7260
ataggtgcct cactgattaa gcattggtaa gcggcgcgcc atcgaatggc gcaaaacctt    7320
tcgcggtatg gcatgatagc gcccggaaga gagtcaattc agggtggtga atatgaaacc    7380
agtaacgtta tacgatgtcg cagagtatgc cggtgtctct tatcagaccg tttcccgcgt    7440
ggtgaaccag gccagccacg tttctgcgaa aacgcgggaa aaagtggaag cggcgatggc    7500
ggagctgaat tacattccca accgcgtggc acaacaactg gcgggcaaac agtcgttgct    7560
gattggcgtt gccacctcca gtctggccct gcacgcgccg tcgcaaattg tcgcggcgat    7620
taaatctcgc gccgatcaac tgggtgccag cgtggtggtg tcgatggtag aacgaagcgg    7680
cgtcgaagcc tgtaaagcgg cggtgcacaa tcttctcgcg caacgcgtca gtgggctgat    7740
cattaactat ccgctggatg accaggatgc cattgctgtg gaagctgcct gcactaatgt    7800
tccggcgtta tttcttgatg tctctgacca gacacccatc aacagtatta ttttctccca    7860
tgaggacggt acgcgactgg gcgtggagca tctggtcgca ttgggtcacc agcaaatcgc    7920
gctgttagcg ggcccattaa gttctgtctc ggcgcgtctg cgtctggctg ctggcataa    7980 atatctcact cgcaatcaaa ttcagccgat agcggaacgg gaaggcgact ggagtgccat    8040
```

```
gtccggtttt caacaaacca tgcaaatgct gaatgagggc atcgttccca ctgcgatgct    8100
ggttgccaac gatcagatgg cgctgggcgc aatgcgcgcc attaccgagt ccgggctgcg    8160
cgttggtgcg gatatctcgg tagtgggata cgacgatacc gaagatagct catgttatat    8220
cccgccgtta accaccatca aacaggattt tcgcctgctg gggcaaacca gcgtggaccg    8280
cttgctgcaa ctctctcagg gccaggcggt gaagggcaat cagctgttgc cagtctcact    8340
ggtgaaaaga aaaaccaccc tggcgcccaa tacgcaaacc gcctctcccc gcgcgttggc    8400
cgattcatta atgcagctgg cacgacaggt ttcccgactg gaaagcgggc agtga         8455
```

<210> SEQ ID NO 3
<211> LENGTH: 1518
<212> TYPE: PRT
<213> ORGANISM: Streptococcus salivarius

<400> SEQUENCE: 3

```
Met Glu Asn Lys Ile His Tyr Lys Leu His Lys Val Lys Lys Gln Trp
1               5                   10                  15

Val Thr Ile Ala Val Ala Ser Val Ala Leu Ala Thr Val Leu Gly Gly
                20                  25                  30

Leu Ser Val Thr Thr Ser Ser Val Ser Ala Asp Glu Thr Gln Asp Lys
            35                  40                  45

Thr Val Thr Gln Ser Asn Ser Gly Thr Thr Ala Ser Leu Val Thr Ser
        50                  55                  60

Pro Glu Ala Thr Lys Glu Ala Asp Lys Arg Thr Asn Thr Lys Glu Ala
65                  70                  75                  80

Asp Val Leu Thr Pro Ala Lys Glu Thr Asn Ala Val Glu Thr Ala Thr
                85                  90                  95

Thr Thr Asn Thr Gln Ala Thr Ala Glu Ala Ala Thr Thr Ala Thr Thr
            100                 105                 110

Ala Asp Val Ala Val Ala Val Pro Asn Lys Glu Ala Val Val Thr
        115                 120                 125

Thr Asp Ala Pro Ala Val Thr Thr Glu Lys Ala Glu Glu Gln Pro Ala
    130                 135                 140

Thr Val Lys Ala Glu Val Val Asn Thr Glu Val Lys Ala Pro Glu Ala
145                 150                 155                 160

Ala Leu Lys Asp Ser Glu Val Glu Ala Ala Leu Ser Leu Lys Asn Ile
                165                 170                 175

Lys Asn Ile Asp Gly Lys Tyr Tyr Val Asn Glu Asp Gly Ser His
            180                 185                 190

Lys Glu Asn Phe Ala Ile Thr Val Asn Gly Gln Leu Leu Tyr Phe Gly
        195                 200                 205

Lys Asp Gly Ala Leu Thr Ser Ser Thr Tyr Ser Phe Thr Pro Gly
    210                 215                 220

Thr Thr Asn Ile Val Asp Gly Phe Ser Ile Asn Asn Arg Ala Tyr Asp
225                 230                 235                 240

Ser Ser Glu Ala Ser Phe Glu Leu Ile Asp Gly Tyr Leu Thr Ala Asp
                245                 250                 255

Ser Trp Tyr Arg Pro Ala Ser Ile Ile Lys Asp Gly Val Thr Trp Gln
            260                 265                 270

Ala Ser Thr Ala Glu Asp Phe Arg Pro Leu Leu Met Ala Trp Trp Pro
        275                 280                 285

Asn Val Asp Thr Gln Val Asn Tyr Leu Asn Tyr Met Ser Lys Val Phe
    290                 295                 300
```

```
Asn Leu Asp Ala Lys Tyr Ser Ser Thr Asp Lys Gln Glu Thr Leu Lys
305                 310                 315                 320

Val Ala Ala Lys Asp Ile Gln Ile Lys Ile Glu Gln Lys Ile Gln Ala
                325                 330                 335

Glu Lys Ser Thr Gln Trp Leu Arg Glu Thr Ile Ser Ala Phe Val Lys
            340                 345                 350

Thr Gln Pro Gln Trp Asn Lys Glu Thr Glu Asn Tyr Ser Lys Gly Gly
        355                 360                 365

Gly Glu Asp His Leu Gln Gly Gly Ala Leu Leu Tyr Val Asn Asp Ser
    370                 375                 380

Arg Thr Pro Trp Ala Asn Ser Asp Tyr Arg Arg Leu Asn Arg Thr Ala
385                 390                 395                 400

Thr Asn Gln Thr Gly Thr Ile Asp Lys Ser Ile Leu Asp Glu Gln Ser
                405                 410                 415

Asp Pro Asn His Met Gly Gly Phe Asp Phe Leu Leu Ala Asn Asp Val
            420                 425                 430

Asp Leu Ser Asn Pro Val Val Gln Ala Glu Gln Leu Asn Gln Ile His
        435                 440                 445

Tyr Leu Met Asn Trp Gly Ser Ile Val Met Gly Asp Lys Asp Ala Asn
    450                 455                 460

Phe Asp Gly Ile Arg Val Asp Ala Val Asp Asn Val Asp Ala Asp Met
465                 470                 475                 480

Leu Gln Leu Tyr Thr Asn Tyr Phe Arg Glu Tyr Tyr Gly Val Asn Lys
                485                 490                 495

Ser Glu Ala Asn Ala Leu Ala His Ile Ser Val Leu Glu Ala Trp Ser
            500                 505                 510

Leu Asn Asp Asn His Tyr Asn Asp Lys Thr Asp Gly Ala Ala Leu Ala
        515                 520                 525

Met Glu Asn Lys Gln Arg Leu Ala Leu Leu Phe Ser Leu Ala Lys Pro
    530                 535                 540

Ile Lys Glu Arg Thr Pro Ala Val Ser Pro Leu Tyr Asn Asn Thr Phe
545                 550                 555                 560

Asn Thr Thr Gln Arg Asp Glu Lys Thr Asp Trp Ile Asn Lys Asp Gly
                565                 570                 575

Ser Lys Ala Tyr Asn Glu Asp Gly Thr Val Lys Gln Ser Thr Ile Gly
            580                 585                 590

Lys Tyr Asn Glu Lys Tyr Gly Asp Ala Ser Gly Asn Tyr Val Phe Ile
        595                 600                 605

Arg Ala His Asp Asn Asn Val Gln Asp Ile Ile Ala Glu Ile Ile Lys
    610                 615                 620

Lys Glu Ile Asn Pro Lys Ser Asp Gly Phe Thr Ile Thr Asp Ala Glu
625                 630                 635                 640

Met Lys Gln Ala Phe Glu Ile Tyr Asn Lys Asp Met Leu Ser Ser Asp
                645                 650                 655

Lys Lys Tyr Thr Leu Asn Asn Ile Pro Ala Ala Tyr Ala Val Met Leu
            660                 665                 670

Gln Asn Met Glu Thr Ile Thr Arg Val Tyr Tyr Gly Asp Leu Tyr Thr
        675                 680                 685

Asp Asp Gly His Tyr Met Glu Thr Lys Ser Pro Tyr Tyr Asp Thr Ile
    690                 695                 700

Val Asn Leu Met Lys Ser Arg Ile Lys Tyr Val Ser Gly Gly Gln Ala
705                 710                 715                 720
```

```
Gln Arg Ser Tyr Trp Leu Pro Thr Asp Gly Lys Met Asp Asn Ser Asp
            725                 730                 735

Val Glu Leu Tyr Arg Thr Asn Glu Val Tyr Thr Ser Val Arg Tyr Gly
        740                 745                 750

Lys Asp Ile Met Thr Ala Asn Asp Thr Glu Gly Ser Lys Tyr Ser Arg
            755                 760                 765

Thr Ser Gly Gln Val Thr Leu Val Ala Asn Asn Pro Lys Leu Asn Leu
770                 775                 780

Asp Gln Ser Ala Lys Leu Asn Val Glu Met Gly Lys Ile His Ala Asn
785                 790                 795                 800

Gln Lys Tyr Arg Ala Leu Ile Val Gly Thr Ala Asp Gly Ile Lys Asn
                805                 810                 815

Phe Thr Ser Asp Ala Asp Ala Ile Ala Ala Gly Tyr Val Lys Glu Thr
            820                 825                 830

Asp Ser Asn Gly Val Leu Thr Phe Gly Ala Asn Asp Ile Lys Gly Tyr
                835                 840                 845

Glu Thr Phe Asp Met Ser Gly Phe Val Ala Val Trp Val Pro Val Gly
    850                 855                 860

Ala Ser Asp Asn Gln Asp Ile Arg Val Ala Pro Ser Thr Glu Ala Lys
865                 870                 875                 880

Lys Glu Gly Glu Leu Thr Leu Lys Ala Thr Glu Ala Tyr Asp Ser Gln
                885                 890                 895

Leu Ile Tyr Glu Gly Phe Ser Asn Phe Gln Thr Ile Pro Asp Gly Ser
                900                 905                 910

Asp Pro Ser Val Tyr Thr Asn Arg Lys Ile Ala Glu Asn Val Asp Leu
            915                 920                 925

Phe Lys Ser Trp Gly Val Thr Ser Phe Glu Met Ala Pro Gln Phe Val
930                 935                 940

Ser Ala Asp Asp Gly Thr Phe Leu Asp Ser Val Ile Gln Asn Gly Tyr
945                 950                 955                 960

Ala Phe Ala Asp Arg Tyr Asp Leu Ala Met Ser Lys Asn Asn Lys Tyr
                965                 970                 975

Gly Ser Lys Glu Asp Leu Arg Asp Ala Leu Lys Ala Leu His Lys Ala
            980                 985                 990

Gly Ile Gln Ala Ile Ala Asp Trp Val Pro Asp Gln Ile Tyr Gln Leu
        995                 1000                1005

Pro Gly Lys Glu Val Val Thr Ala Thr Arg Thr Asp Gly Ala Gly
    1010                1015                1020

Arg Lys Ile Ala Asp Ala Ile Ile Asp His Ser Leu Tyr Val Ala
    1025                1030                1035

Asn Ser Lys Ser Ser Gly Lys Asp Tyr Gln Ala Lys Tyr Gly Gly
    1040                1045                1050

Glu Phe Leu Ala Glu Leu Lys Ala Lys Tyr Pro Glu Met Phe Lys
    1055                1060                1065

Val Asn Met Ile Ser Thr Gly Lys Pro Ile Asp Asp Ser Val Lys
    1070                1075                1080

Leu Lys Gln Trp Lys Ala Glu Tyr Phe Asn Gly Thr Asn Val Leu
    1085                1090                1095

Glu Arg Gly Val Gly Tyr Val Leu Ser Asp Glu Ala Thr Gly Lys
    1100                1105                1110

Tyr Phe Thr Val Thr Lys Glu Gly Asn Phe Ile Pro Leu Gln Leu
    1115                1120                1125

Thr Gly Lys Glu Lys Val Ile Thr Gly Phe Ser Ser Asp Gly Lys
```

```
                   1130                1135                1140
Gly Ile Thr Tyr Phe Gly Thr Ser Gly Thr Gln Ala Lys Ser Ala
        1145                1150                1155
Phe Val Thr Phe Asn Gly Asn Thr Tyr Tyr Phe Asp Ala Arg Gly
        1160                1165                1170
His Met Val Thr Asn Ser Glu Tyr Ser Pro Asn Gly Lys Asp Val
        1175                1180                1185
Tyr Arg Phe Leu Pro Asn Gly Ile Met Leu Ser Asn Ala Phe Tyr
        1190                1195                1200
Ile Asp Ala Asn Gly Asn Thr Tyr Leu Tyr Asn Ser Lys Gly Gln
        1205                1210                1215
Met Tyr Lys Gly Gly Tyr Thr Lys Phe Asp Val Ser Glu Thr Asp
        1220                1225                1230
Lys Asp Gly Lys Glu Ser Lys Val Val Lys Phe Arg Tyr Phe Thr
        1235                1240                1245
Asn Glu Gly Val Met Ala Lys Gly Val Thr Val Ile Asp Gly Phe
        1250                1255                1260
Thr Gln Tyr Phe Gly Glu Asp Gly Phe Gln Ala Lys Asp Lys Leu
        1265                1270                1275
Val Thr Phe Lys Gly Lys Thr Tyr Tyr Phe Asp Ala His Thr Gly
        1280                1285                1290
Asn Gly Ile Lys Asp Thr Trp Arg Asn Ile Asn Gly Lys Trp Tyr
        1295                1300                1305
Tyr Phe Asp Ala Asn Gly Val Ala Ala Thr Gly Ala Gln Val Ile
        1310                1315                1320
Asn Gly Gln Lys Leu Tyr Phe Asn Glu Asp Gly Ser Gln Val Lys
        1325                1330                1335
Gly Gly Val Val Lys Asn Ala Asp Gly Thr Tyr Ser Lys Tyr Lys
        1340                1345                1350
Glu Gly Phe Gly Glu Leu Val Thr Asn Glu Phe Phe Thr Thr Asp
        1355                1360                1365
Gly Asn Val Trp Tyr Tyr Ala Gly Ala Asn Gly Lys Thr Val Thr
        1370                1375                1380
Gly Ala Gln Val Ile Asn Gly Gln His Leu Tyr Phe Asn Ala Asp
        1385                1390                1395
Gly Ser Gln Val Lys Gly Gly Val Val Lys Asn Ala Asp Gly Thr
        1400                1405                1410
Tyr Ser Lys Tyr Asn Ala Ser Thr Gly Glu Arg Leu Thr Asn Glu
        1415                1420                1425
Phe Phe Thr Thr Gly Asp Asn Asn Trp Tyr Tyr Ile Gly Ala Asn
        1430                1435                1440
Gly Lys Ser Val Thr Gly Glu Val Lys Ile Gly Asp Asp Thr Tyr
        1445                1450                1455
Phe Phe Ala Lys Asp Gly Lys Gln Val Lys Gly Gln Thr Val Ser
        1460                1465                1470
Ala Gly Asn Gly Arg Ile Ser Tyr Tyr Gly Asp Ser Gly Lys
        1475                1480                1485
Arg Ala Val Ser Thr Trp Ile Glu Ile Gln Pro Gly Val Tyr Val
        1490                1495                1500
Tyr Phe Asp Lys Asn Gly Leu Ala Tyr Pro Pro Arg Val Leu Asn
        1505                1510                1515
```